United States Patent
Park et al.

(10) Patent No.: US 12,464,342 B2
(45) Date of Patent: Nov. 4, 2025

(54) ELECTRONIC DEVICE FOR TRANSMITTING DATA USING SHORT-RANGE WIRELESS COMMUNICATION AND OPERATING METHOD THEREOF

(71) Applicant: Samsung Electronics Co., Ltd., Suwon-si (KR)

(72) Inventors: Junhyung Park, Suwon-si (KR); Seokhyun Kim, Suwon-si (KR); Chaigil Lim, Suwon-si (KR); Nojoon Park, Suwon-si (KR); Jinwoo Jeon, Suwon-si (KR); Gajin Song, Suwon-si (KR); Sunkey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 17/951,815

(22) Filed: Sep. 23, 2022

(65) Prior Publication Data

US 2023/0091755 A1 Mar. 23, 2023

Related U.S. Application Data

(63) Continuation of application No. PCT/KR2022/014203, filed on Sep. 22, 2022.

(30) Foreign Application Priority Data

Sep. 23, 2021 (KR) .................. 10-2021-0125863

(51) Int. Cl.
*H04W 4/00* (2018.01)
*H04W 8/22* (2009.01)
(Continued)

(52) U.S. Cl.
CPC ............. *H04W 8/22* (2013.01); *H04W 12/06* (2013.01); *H04W 48/16* (2013.01); *H04W 72/51* (2023.01)

(58) Field of Classification Search
CPC ....... H04W 8/22; H04W 72/51; H04W 12/06; H04W 48/16
(Continued)

(56) References Cited

U.S. PATENT DOCUMENTS 10,999,154 B1 5/2021 Ahrenholz et al.
2004/0255033 A1 12/2004 Edney et al.
(Continued)

FOREIGN PATENT DOCUMENTS

CN 1545789 A 11/2004
CN 101006433 A 7/2007
(Continued)

OTHER PUBLICATIONS

European Search Report dated Jul. 5, 2024, issued in European Application No. 22873189.9.
(Continued)

*Primary Examiner* — Temica M Beamer
(74) *Attorney, Agent, or Firm* — Jefferson IP Law, LLP

(57) ABSTRACT

An electronic device is provided. The electronic device includes at least one communication module, and a processor. The processor may be configured to select an external device supporting a directional communication scheme. The processor may be configured to acquire a first identifier of the selected external device through at least one of the at least one communication module. The processor may be configured to configure action information and authentication information. The processor may be configured to transmit authentication data generated based on the first identifier, the action information, and the authentication
(Continued)

information to the external device through at least one of the at least one communication module.

23 Claims, 11 Drawing Sheets

(51) Int. Cl.
   *H04W 12/06* (2021.01)
   *H04W 48/16* (2009.01)
   *H04W 72/51* (2023.01)
(58) Field of Classification Search
   USPC .......................................................... 370/329
   See application file for complete search history.

(56) References Cited

U.S. PATENT DOCUMENTS

| | | | |
|---|---|---|---|
| 2007/0015463 | A1 | 1/2007 | Abel et al. |
| 2008/0005794 | A1 | 1/2008 | Inoue et al. |
| 2012/0260311 | A1 | 10/2012 | Kang |
| 2014/0073244 | A1 | 3/2014 | Ko et al. |
| 2017/0223005 | A1 | 8/2017 | Birgisson et al. |
| 2018/0191889 | A1 | 7/2018 | Gerhardt et al. |
| 2018/0191890 | A1 | 7/2018 | Ham et al. |
| 2019/0135229 | A1* | 5/2019 | Ledvina ................ H04W 12/50 |
| 2020/0106877 | A1* | 4/2020 | Ledvina ............... H04L 63/0869 |
| 2020/0223392 | A1 | 7/2020 | Kim et al. |
| 2021/0241551 | A1 | 8/2021 | Loeshelle |
| 2022/0078578 | A1* | 3/2022 | Brumley ............... G01S 13/767 |
| 2023/0164622 | A1* | 5/2023 | Kim .................. H04W 28/0284 370/235 |
| 2025/0016564 | A1* | 1/2025 | Pirch ..................... H04W 12/64 |

FOREIGN PATENT DOCUMENTS

| | | |
|---|---|---|
| CN | 112102541 A | 12/2020 |
| JP | 2008/009630 A | 1/2008 |
| KR | 10-2012-0117910 A | 10/2012 |
| KR | 10-2015-0072308 A | 6/2015 |
| KR | 10-2017-0001435 A | 1/2017 |
| KR | 10-2018-0053701 A | 5/2018 |
| KR | 10-1974820 B1 | 8/2019 |
| KR | 10-2019-0110393 A | 9/2019 |
| KR | 10-2021-0056747 A | 5/2021 |
| WO | 2017/131887 A1 | 8/2017 |

OTHER PUBLICATIONS

International Search Report dated Jan. 5, 2023, issued in an International Application No. PCT/KR2022/014203.
Korean Office Action dated Sep. 16, 2025, issued in Korean Patent Application No. 10-2021-0125863.

* cited by examiner

ELECTRONIC DEVICE FOR TRANSMITTING DATA USING SHORT-RANGE WIRELESS COMMUNICATION AND OPERATING METHOD THEREOF

CROSS-REFERENCE TO RELATED APPLICATION(S)

This application is a continuation application, claiming priority under § 365(c), of an International application No. PCT/KR2022/014203, filed on Sep. 22, 2022, which is based on and claims the benefit of a Korean patent application number 10-2021-0125863, filed on Sep. 23, 2021, in the Korean Intellectual Property Office, the disclosure of which is incorporated by reference herein in its entirety.

TECHNICAL FIELD

The disclosure relates to an electronic device for transmitting data through short-range wireless communication and a method of operating the same.

BACKGROUND ART

An electronic device may mean a device performing a specific function according to an installed program, such as an electronic note, a portable multimedia player, a mobile communication terminal, a tablet personal computer (PC), a video/sound device, a desktop/laptop computer, a vehicle navigation device, an air-conditioner, a fan, a light device, and the like as well as home appliances.

When the electronic device supports a directional communication scheme (e.g., an ultra-wideband (UWB) communication scheme or an IEEE 802.11ad/ay scheme in Wi-Fi 60 Ghz band), the electronic device may identify the location relative to another electronic device supporting the directional communication scheme through the directional communication scheme.

The electronic device may transmit data to another electronic device through communication (e.g., wireless communication). When the electronic device transmits data to another electronic device, the electronic device should perform an operation of selecting data to be transmitted, selecting another electronic device to which the data is transmitted, and transmitting the data.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

When the electronic device transmits data to a plurality of other electronic devices, the electronic device should repeatedly perform the same operation, thereby wasting resources. For example, when a host user desires to share the same data (e.g., presentation files for meeting) with electronic devices of guest users who participate in the meeting through an electronic device, there is a problem in that the host user should repeat the same operation a number of times corresponding to the number of guest users who participate in the meeting.

Aspects of the disclosure are to address at least the above-mentioned problems and/or disadvantages and to provide at least the advantages described below. Accordingly, an aspect of the disclosure is to provide an electronic device for transmitting data through short-range wireless communication and a method by which a user of the electronic device can provide data to another electronic device of another user through another directional communication device supporting a directional communication scheme.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one communication circuit, and at least one processor, wherein the at least one processor is configured to select an external device supporting a directional communication scheme, acquire a first identifier of the selected external device through at least one of the at least one communication circuit, configure action information and authentication information, and transmit authentication data generated based on the first identifier, the action information, and the authentication information to the selected external device through at least one of the at least one communication circuit.

In accordance with another aspect of the disclosure, an electronic device is provided. The electronic device includes at least one communication circuit, and at least one processor, wherein the at least one processor is configured to transmit a first identifier of the electronic device to a first external device through at least one of the at least one communication circuit, receive authentication data generated based on the first identifier, and action information and authentication information configured in the first external device from the first external device through at least one of the at least one communication module, determine whether a state in which a second external device faces the electronic device satisfies a first condition through a first communication circuit supporting a directional communication scheme among the at least one communication circuit, authenticate the second external device, based on the authentication information and identification information received from the second external device according to satisfaction of the first condition by the state in which the second external device faces the electronic device, and transmit the authentication data to the second external device through at least one of the at least one communication circuit, based on the authentication of the second external device.

In accordance with another aspect of the disclosure, an electronic device is provided. The electronic device includes at least one communication circuit, and at least one processor, wherein the at least one processor is configured to identify a first external device supporting a directional communication scheme through a first communication circuit supporting the directional communication scheme among the at least one communication circuit, transmit identification information to the identified first external device through at least one of the at least one communication circuit, based on satisfaction of a first condition by a state in which the electronic device faces the first external device, and receive authentication data from the identified first external device through at least one of the at least one communication circuit, based on authentication of the electronic device based on the identification information and authentication information stored in the first external device.

Advantageous Effects

It is possible to provide a method of transmitting data through another relay device mediating data when a user of an electronic device transmits data to another electronic device of another user by providing an electronic device for transmitting data through short-range wireless communication and a method of operating the same.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
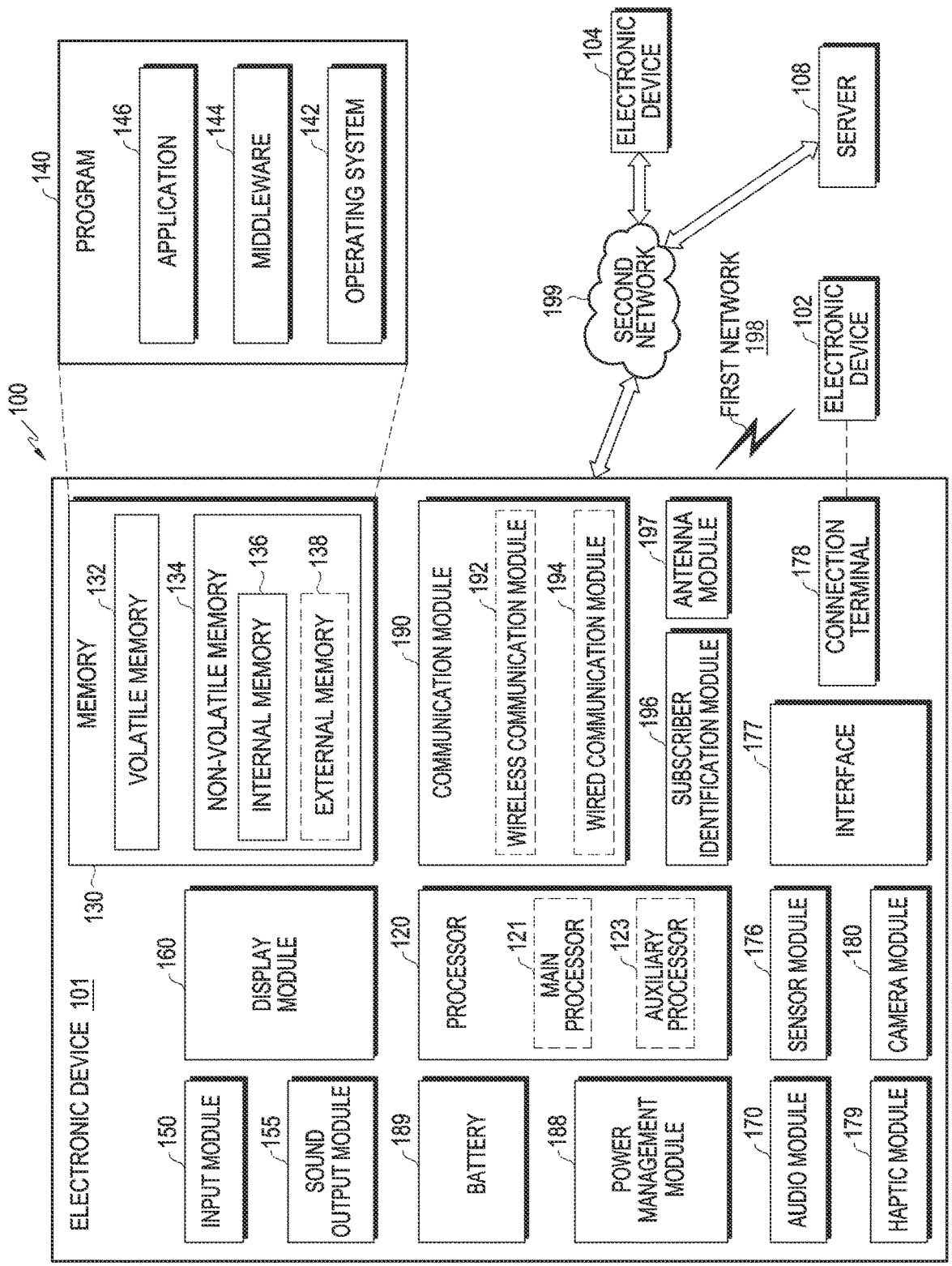
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th Generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th Generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas, patch antennas, or LBS antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
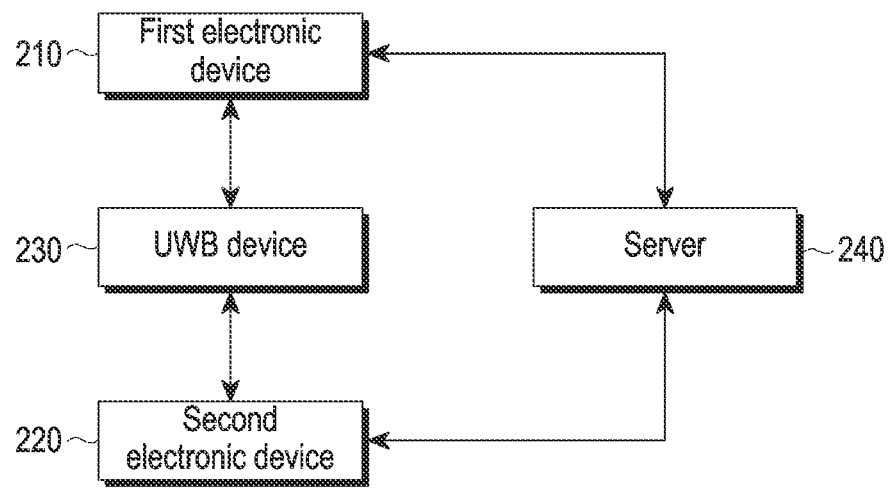
FIG. 2 is a block diagram illustrating electronic devices within a network environment according to an embodiment of the disclosure.

FIG. 2 is a block diagram illustrating electronic devices within a network environment according to an embodiment of the disclosure.

Referring to FIG. 2, the network environment according to various embodiments may include a first electronic device 210, a second electronic device 220, a UWB device 230, and a server 240. The first electronic device 210 and the second electronic device 220 may be implemented to be the same as the electronic device 101 of FIG. 1 or may include at least partially common hardware. The UWB device 230 may support a communication scheme (e.g., an ultra-wideband (UWB) communication scheme). The UWB device 230 may be implemented to be the same as the electronic device 101 of FIG. 1 or may include at least partially common hardware, but there is no limit in a method of implementing the UWB device 230. Meanwhile, the UWB device 230 may additionally support other types of communication schemes (e.g., BLE) as well as the UWB communication scheme, and there is no limit in the type and/or the number of additionally supported communication schemes. According to an embodiment, hereinafter, an operation of the UWB device 230 supporting a directional communication scheme (e.g., a UWB communication scheme) is disclosed, but it should be understood by those skilled in the art that the operation of the UWB device 320 described below can be similarly performed by another electronic device (not shown) supporting another directional communication scheme (e.g., an IEEE 802.11ad/ay scheme in Wi-Fi 60 Ghz band). For example, operations of the UWB device 230 performed using the UWB communication scheme may be performed using another directional communication scheme (e.g., an IEEE 802.11ad/ay scheme in Wi-Fi 60 Ghz band) by another electronic device (not shown). Hereinafter, the operation of the UWB device 230 supporting the UWB communication scheme is described for convenience of description, but the type of the electronic device (not shown) supporting the directional communication scheme (e.g., the UWB communication scheme or the IEEE 802.11ad/ay scheme in Wi-Fi 60 Ghz band) is not limited to the UWB device 230. The server 240 may be implemented to be the same as the server 108 of FIG. 1 or may include at least partially common hardware, but there is no limit in the form of the server 240. For example, the server 240 may be implemented as an edge computing device which provides an edge computing function operating in an Internet of things (IoT) network.

The first electronic device 210 according to various embodiments may include at least one communication module (e.g., communication modules implemented to be the same as the communication modules 190 of FIG. 1 or communication modules including at least some of at least one hardware included in the communication modules 190). For example, the first electronic device 210 may include a communication module (e.g., a communication module implemented to be the same as the wireless communication module 192 of FIG. 1 or a communication module including at least some of at least one hardware included in the wireless communication module 192) supporting the UWB communication scheme. For example, the first electronic device 210 may include a communication module (e.g., a communication module implemented to be the same as the wireless communication module 192 of FIG. 1 or a communication module including at least some of at least one hardware included in the wireless communication module 192) supporting a short-range communication scheme (e.g., a BLE communication scheme) and there is no limit in the communication scheme supported by the first electronic device 210.

The second electronic device 220 according to various embodiments may include at least one communication module (e.g., communication modules implemented to be the same as the communication modules 190 of FIG. 1 or communication modules including at least some of at least one hardware included in the communication modules 190), and it may be understood that a description of the communication scheme of the second electronic device 220 is similar to the description of the communication scheme of the first electronic device 210 described above.

The UWB device 230 according to various embodiments may include at least one communication module (e.g., communication modules implemented to be the same as the communication modules 190 of FIG. 1 or communication modules including at least some of at least one hardware included in the communication modules 190), and it may be understood that a description of the communication scheme of the UWB device 230 is similar to the description of the communication scheme of the first electronic device 210 described above.

Referring to FIG. 2, the first electronic device 210 according to various embodiments may communicate with the UWB device 230 and/or the server 240 through at least one of the at least one communication module (e.g., communication modules implemented to be the same as the communication modules 190 of FIG. 1 or communication modules including at least some of at least one hardware included in the communication modules 190). The second electronic device 220 according to various embodiments may communicate with the UWB device 230 and/or the server 240 through at least one of the at least one communication module (e.g., communication modules implemented to be the same as the communication modules 190 of FIG. 1 or communication modules including at least some of at least one hardware included in the communication modules 190). The UWB device 230 according to various embodiments may communicate with the first electronic device 210 and/or the second electronic device 220 through at least one of the at least one communication module (e.g., communication modules implemented to be the same as the communication modules 190 of FIG. 1 or communication modules including at least some of at least one hardware included in the communication modules 190).

According to various embodiments, one electronic device (e.g., one electronic device among the first electronic device 210, the second electronic device 220, or the UWB device 230) within the network environment may recognize another electronic device (e.g., another electronic device among the first electronic device 210, the second electronic device 220, or the UWB device 230) through a communication module (e.g., a communication module implemented to be the same as the wireless communication module 192 of FIG. 1 or a communication module including at least some of at least one hardware included in the wireless communication module 192) supporting a UWB communication scheme. For example, one electronic device (e.g., one electronic device among the first electronic device 210, the second electronic device 220, or the UWB device 230) within the network environment may identify the location (e.g., the distance and/or the direction) of another electronic device (e.g., another electronic device among the first electronic device 210, the second electronic device 220, or the UWB device 230) through a communication module (e.g., a communication module implemented to be the same as the wireless communication module 192 of FIG. 1 or a communication module including at least some of at least one hardware included in the wireless communication module 192) supporting a UWB communication scheme. A description about the UWB device 230 and the second electronic device 220 by way of example is made below, and the description may be applied to electronic devices (e.g., the first electronic device 210, the second electronic device 220, and the UWB device 230) within the network environment. For example, the UWB device 230 may identify the relative location between the UWB device 230 and the second electronic device 220 through a communication module supporting a UWB communication scheme and recognize the second electronic device 220 on the basis of the relative location between the UWB device 230 and the second electronic device 220 corresponding to a preset range. For example, the preset range may include a preset angle range and/or a preset distance range. For example, the UWB device 230 may recognize the second electronic device 220 on the basis of the second electronic device 220 facing the UWB device 230. Recognition of the second electronic device 220 by the UWB device 230 may mean that the UWB device 230 and the second electronic device 220 transmit and receive messages (e.g., a ranging poll message in the UWB communication scheme (or a ranging initiation message), a ranging response message, and/or a ranging final message) using the UWB communication scheme and thus the relative location between the UWB device 230 and the second electronic device 220 is included within a preset range on the basis of an angle of arrival (AOA) scheme, a single-sided two-way ranging (SS-TWR) scheme, and/or a double-sided two-way ranging (DS-TWR) scheme. Non-recognition of the second electronic device 220 by the UWB device 230 may mean that the UWB device 230 and the second electronic device 220 do not transmit and receive messages (e.g., a ranging poll message in the UWB communication scheme (or a ranging initiation message), a ranging response message, and/or a ranging final message) using the UWB communication scheme. Alternatively, non-recognition of the second electronic device 220 by the UWB device 230 may mean that the UWB device 230 and the second electronic device 220 transmit at least some of the messages (e.g., a ranging poll message in the UWB communication scheme (or a ranging initiation message), a ranging response message, and/or a ranging final message) using the UWB communication scheme but do not receive responses message of the transmitted messages. Alternatively, non-recognition of the second electronic device 220 by the UWB device 230 may mean that the UWB device 230 and the second electronic device 220 transmit at least some of the messages (e.g., a ranging poll message in the UWB communication scheme (or a ranging initiation message), a ranging response message, and/or a ranging final message) using the UWB communication scheme but identify that the relative location between the UWB device 230 and the second electronic device 220 is not included within a preset range on the basis of an angle of arrival (AOA) scheme, a single-sided two-way ranging (SS-TWR) scheme, and/or a double-sided two-way ranging (DS-TWR) scheme and thus determine that the UWB device 230 and the second electronic device 220 are not targets to be connected to each other (or targets to be recognized).

Figure 3:
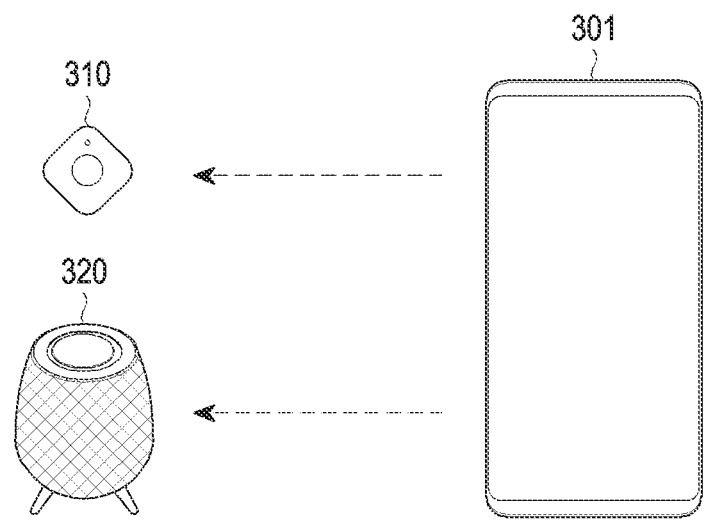
FIG. 3 illustrates operations of electronic devices within a network environment according to an embodiment of the disclosure.

FIG. 3 illustrates operations of electronic devices within the network environment according to an embodiment of the disclosure.

Referring to FIG. 3, the network environment according to various embodiments may include an electronic device 301, a UWB tag device 310, and/or a UWB device 320. The electronic device 301 may be the first electronic device 210 or the second electronic device 220 of FIG. 2. The UWB tag device 310 and the UWB device 320 may be implemented to be the same as the UWB device 230 of FIG. 2 or may include at least partially common hardware. For example, the UWB device 230 of FIG. 2 may be the UWB tag device 310 of FIG. 3 or the UWB device 320 of FIG. 3.

The UWB tag device 310 according to various embodiments may include a memory (not shown). For example, the UWB tag device 310 may communicate with the electronic device 301. For example, the UWB tag device 310 may transmit data stored in the memory (not shown) to the electronic device 301 and store the data received from the electronic device 301 in the memory (not shown). For example, the UWB tag device 310 may store information on a unique identifier of the UWB tag device 310, information on a media access control (MAC) address of the UWB tag device 310, and/or information on a unique certificate of authentication of the UWB tag device 310. The unique identifier or the unique certificate of authentication is an identifier or a certificate of authentication indicating the corresponding device and there is limit in the form thereof.

The UWB device 320 according to various embodiments may include a memory (not shown). It may be understood that a description of the memory (not shown) of the UWB device 320 and information stored in the memory (not shown) of the UWB device 320 is similar to the description of the memory (not shown) of the UWB tag device 310 and information stored the memory (not shown) of the UWB tag device 310.

Although not illustrated in FIG. 3, the network environment according to various embodiments may include an electronic device (not shown) which does not support the UWB communication scheme. For convenience of the following description, the electronic device which does not support the UWB communication scheme may be called a normal electronic device.

The UWB device 320 and/or the normal electronic device (not shown) according to various embodiments may be devices capable of performing a unique function. For example, the UWB device 320 and/or the normal electronic device (not shown) may be speakers, TVs, refrigerators, air-conditioners, fans, lamps, clocks, microwave ovens, cook tops, washing machines, or drying machines, and there is no limit in types of the UWB device 320 and/or the normal electronic device (not shown). For example, the electronic device 301 may control the UWB device 320 and/or the normal electronic device (not shown). Controlling the UWB device 320 and/or the normal electronic device (not shown) by the electronic device 301 may mean that the electronic device 301 transmits a control signal to the UWB device 320 and/or the normal electronic device (not shown) and the UWB device 320 and/or the normal electronic device (not shown) performs a function corresponding to the control signal on the basis of the received control signal. For example, the electronic device 301 may control the UWB device 320 and/or the normal electronic device (not shown) on the basis of a right to control the UWB device 320 and/or a right to control the normal electronic device (not shown). For example, when acquiring the right to control the UWB device 320 and/or the right to control the normal electronic device (not shown) from the UWB tag device 310, the UWB device 320, or the server (e.g., the server 240 of FIG. 2), the electronic device 301 may control the UWB device 320 and/or the normal electronic device (not shown).

Figure 4:
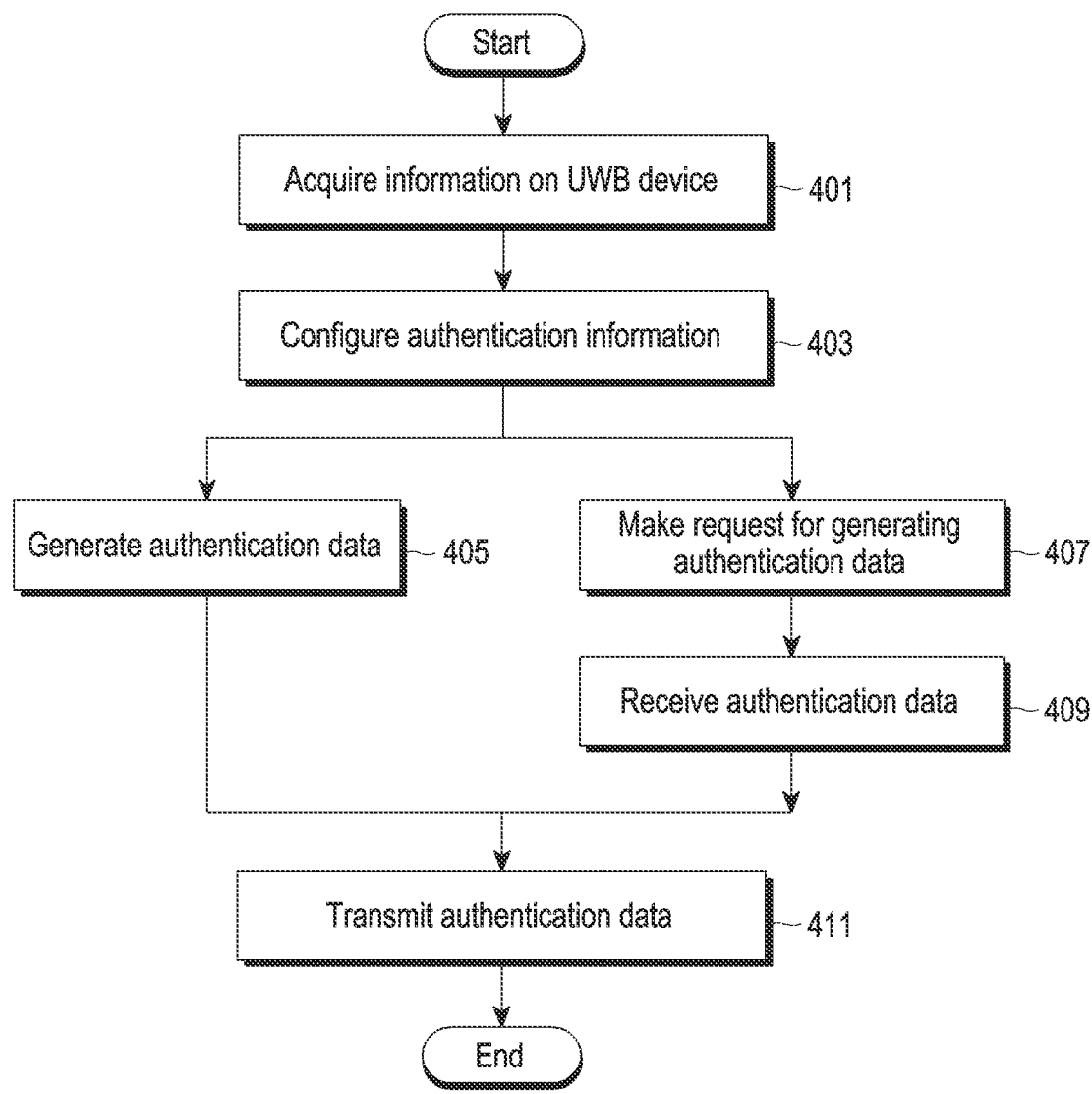
FIG. 4 is a flowchart illustrating an operation of an electronic device within a network environment according to an embodiment of the disclosure.

FIG. 4 is a flowchart illustrating an operation of an electronic device within the network environment according to an embodiment of the disclosure. FIG. 4 is described with reference to FIGS. 2 and 3. The operation of the first electronic device 210 of FIG. 2 may be understood with reference to FIG. 4.

Referring to FIG. 4, in operation 401, the first electronic device 210 (e.g., a processor (e.g., 120 of FIG. 1) of the first electronic device 210) according to various embodiments may acquire information on the UWB device 230. For example, information on the UWB device 230 may include information on a unique identifier of the UWB device 230, information on a media access control (MAC) address of the UWB device 230, and/or information on a unique certificate of authentication of the UWB device 230. According to an embodiment, the first electronic device 210 may acquire information on the UWB device 230 from the UWB device 230 through at least one of the at least one communication module (e.g., the communication modules 190 of FIG. 1) of the first electronic device 210. For example, the first electronic device 210 may acquire information on the UWB device 230 from the UWB device 230 through a directional communication module (e.g., a communication module supporting a UWB communication scheme or a communication module supporting an IEEE 802.11ad/ay scheme of a Wi-Fi 60 Ghz band) or a short-range wireless communication module (e.g., a BLE communication module). For example, the first electronic device 210 may receive a UWB broadcasting signal from the UWB device 230, establish a UWB communication connection, and acquire information on the UWB device 230 through at least one (e.g., a UWB communication module, a BLE communication module, or a communication module supporting an IEEE 802.11ad/ay scheme of a Wi-Fi 60 Ghz band) of at least one communication module (e.g., the communication modules 190 of FIG. 1) of the first electronic device 210. For example, the first electronic device 210 may transmit a signal making a request for driving a UWB communication module of the UWB device 230 to the UWB device 230 through a BLE communication module, establish a UWB communication connection with the UWB device 230, and acquire information on the UWB device 230 through at least one (e.g., a UWB communication module, a BLE communication module, or a communication module supporting an IEEE 802.11ad/ay of a Wi-Fi 60 Ghz band) of the at least one communication module (e.g., the communication modules 190 of FIG. 1) of the first electronic device 210. According to an embodiment, the first electronic device 210 may acquire information on the UWB device 230 from the server 240 through at least one of the at least one communication module (e.g., the communication modules 190 of FIG. 1) of the first electronic device 210.

In operation 403, the first electronic device 210 according to various embodiments may configure authentication information and/or action information. For example, the authentication information may be information used by one electronic device within the network environment to authentication another electronic device. For example, the action information may be information on a predetermined action to be performed by one electronic device within the network environment. For example, the first electronic device 210 may configure the authentication information and/or the action information on the basis of a user input. For example, the first electronic device 210 may configure the authentication information and/or the action information on the basis of a predetermined configuration. Hereinafter, the authentication information and/or the action information are separately described, but it is only for convenience of description, and there is no limit on the form of the authentication information and/or the action information.

According to an embodiment, the authentication information may include provision condition information, security procedure information, or receiver information.

According to an embodiment, the provision condition information may be information on a reference for determining whether a predetermined provision condition is satisfied. For example, the provision condition information may include information on a reference range and/or a reference time for the relative location (e.g., the distance and/or the direction) between one electronic device and another electronic device. For example, the relative location between one electronic device and another electronic device satisfying the provision condition according to the provision condition information may mean that the relative location between one electronic device and another electronic device is included in a reference range or the state in which the relative location between one electronic device and another electronic device is included in the reference range continues for a reference time. According to an embodiment, the first electronic device 210 may configure provision condition information between the second electronic device 220 and the UWB device 230. According to an embodiment, although not illustrated, the UWB device 230 may configure provision condition information between the second electronic device 220 and the UWB device 230 on the basis of a predetermined condition.

According to an embodiment, the security procedure information may be information on a security procedure required for acquiring action information (or authentication data described below). For example, the security procedure information may include information on a password, a gesture, a pattern, or biometric authentication. For example, as the security procedure passes on the basis of the security procedure information, the second electronic device 220 may acquire action information (or authentication data described below) from the UWB device 230.

According to an embodiment, the receiver information may be information which is a reference for determining whether a receiver is a target to issue action information (or authentication data described below). For example, the receiver information may include identification information (e.g., a unique identifier of a user) of the user who is a target to issue action information (or authentication data described below) or identification information (e.g., a unique identifier of a device) which is a target to issue the same. For example, the UWB device 230 may compare identification information provided from the second electronic device 220 (e.g., identification information of the second electronic device 220 or identification information of the user of the second electronic device 220) with receiver information so as to determine whether the second electronic device 220 is a target to issue action information (or authentication data described below).

According to an embodiment, the action information may include information on a control right, a content file, or use condition information.

According to an embodiment, the information on the control right may be information on a right to control, by one electronic device within the network environment, another electronic device which is a target to be controlled. For example, when the action information includes the information on the control right, one electronic device acquiring the action information may control another electronic device which is a target to be controlled. For example, in FIG. 3, an electronic device 301 may control a UWB device 320 on the basis of a right to control the UWB device 320.

According to an embodiment, the content file may be a file executed by an application (e.g., a gallery application or a multimedia application). For example, the content file may be an image file, a video file, or a text file, and there is no limit in the type of content files. For example, when the action information includes a content file, one electronic device acquiring the action information may execute the content file included in the action information by using an application corresponding to the content file.

According to an embodiment, the use condition information may be information on conditions for using action information (e.g., information on the control right and/or the content file). For example, the use condition information may include information on a use period, the number of uses, or a use range. For example, the use condition information may include information on a use period (e.g., available for 3 days after reproduction or available from 10 o'clock on Aug. 10, 2021 to 12 o'clock on Aug. 10, 2021) of the content file (e.g., a video file), the number of uses (e.g., the video file can be executed three times), or a use range (e.g., a range of the video file from 10 minutes and 10 seconds to 20 minutes and 20 seconds can be reproduced). For example, the use condition information may include information on a use period (e.g., an air-conditioner can be controlled for 3 hours or can be controlled from 10 o'clock on Aug. 10, 2021 to 12 o'clock on Aug. 10, 2021) of a device which is a target to be controlled, the number of uses (e.g., a microwave oven can be controlled three times), or a use range (e.g., a volume control function among a speaker play function and the volume control function can be controlled). According to an embodiment, the use condition information may be included in the action information as described above or may be included in authentication information according to another embodiment. For example, when the use condition information is included in the authentication information, the use condition information may include information on a period during which authentication data can be issued and/or the number of times authentication data can be issued.

According to an embodiment, in operation 405, the first electronic device 210 may generate authentication data on the basis of the information on the UWB device 230, the action information, and/or the authentication information. The authentication data may be a right to access action information. For example, at least one electronic device issuing authentication data may acquire action information corresponding to the authentication data on the basis of the authentication data. For example, the second electronic device 220 may acquire action information corresponding to the authentication data on the basis of the authentication data. According to an embodiment, the authentication data may include the information on the UWB device 230, the action information, and/or the authentication information, or may be generated using, for example, the information on the UWB device 230, the action information, and/or the authentication information. According to an embodiment, the authentication data may include identification information of the first electronic device 210 (e.g., a unique identifier of the first electronic device 210) or identification information of a user of the first electronic device 210 (e.g., a unique identifier of the user of the first electronic device 210) or may be generated on the basis of the corresponding information. For example, the authentication data may be implemented in the form of an authentication token or a certificate of authentication, and there is no limit in the implementation form of authentication data.

According to an embodiment in operation 407, the first electronic device 210 may transmit a signal making a request for generating authentication data to the server 240. For example, the first electronic device 210 may transmit a request signal including the information on the UWB device 230, the action information, and/or the authentication information to the server 240. According to an embodiment, the first electronic device 210 may include identification information of the first electronic device 210 (e.g., a unique identifier of the first electronic device 210) or identification information of a user of the first electronic device 210 (e.g., a unique identifier of the user of the first electronic device 210) and transmit a signal making a request for generating authentication data. For example, the first electronic device 210 may transmit a request signal including the information on the UWB device 230, the action information, the authentication information, and/or the identification information (e.g., identification information of the first electronic device 210 (e.g., a unique identifier of the first electronic device 210) or identification information of a user of the first electronic device 210 (e.g., a unique identifier of the user of the first electronic device 210)) to the server 240. FIG. 4 illustrates that the first electronic device 210 can perform all of operation 405 and operation 407, but it is only an example. According to various embodiments, the first electronic device 210 may select one of the two operations and operate supporting all of operation 405 and operation 407 or may be implemented to support only operation 405 or operation 407.

According to an embodiment, in operation 409, the first electronic device 210 may receive authentication data generated by the server 240 from the server 240 on the basis of the information on the UWB device 230, the action information, the authentication information, and/or the identification information (e.g., identification information of the first electronic device 210 (e.g., a unique identifier of the first electronic device 210) or identification information of a user of the first electronic device 210 (e.g., a unique identifier of the user of the first electronic device 210)). The description of the authentication data in operation 409 may be understood to be similar to the description of the authentication data in operation 405.

In operation 411, the first electronic device 210 according to various embodiments may transmit authentication data to the UWB device 230. The authentication data generated in operation 405 or the authentication data received in operation 409 is authentication data generated to be transmitted to the UWB device 230 and may be named temporary authentication data.

Figure 5:
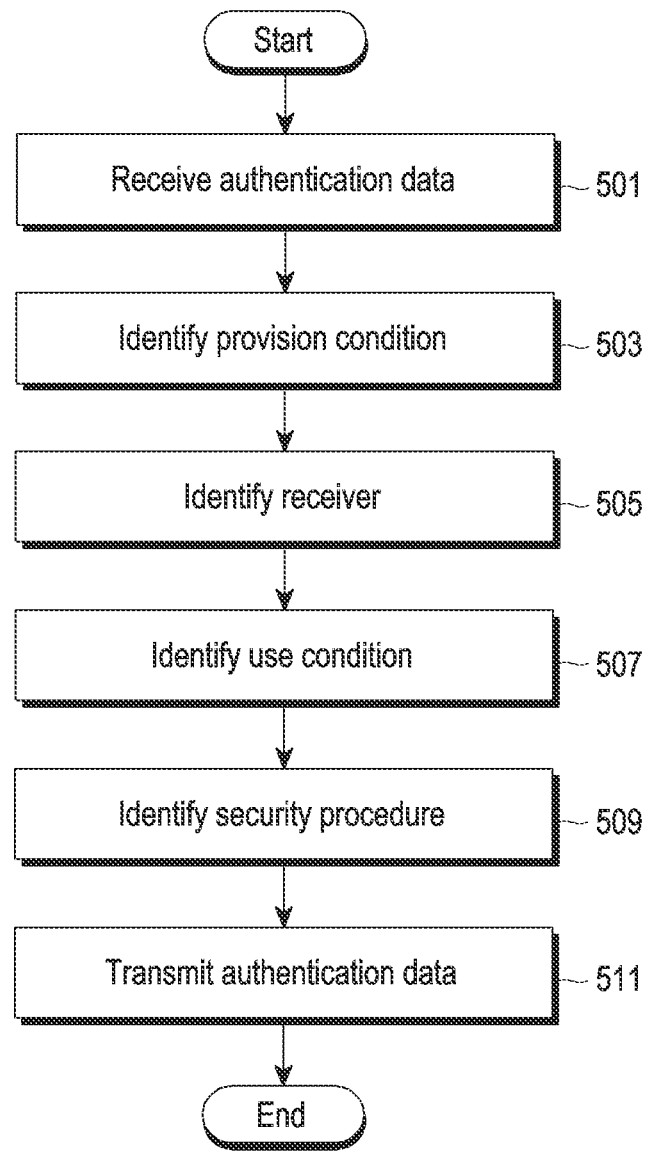
FIG. 5 is a flowchart illustrating an operation of an electronic device within a network environment according to an embodiment of the disclosure.

FIG. 5 is a flowchart illustrating an operation of an electronic device within a network environment according to an embodiment of the disclosure. FIG. 5 is described with reference to FIGS. 2 and 3. The operation of the UWB device 230 of FIG. 2 may be understood with reference to FIG. 5.

Referring to FIG. 5, in operation 501, the UWB device 230 (e.g., the process or of the UWB device 230 (e.g., 120 of FIG. 1)) according to various embodiments may receive authentication data from the first electronic device 210. For example, the UWB device 230 may receive authentication data from the first electronic device 210 through at least one of the at least one communication module (e.g., the communication modules 190 of FIG. 1) of the UWB device 230. According to an embodiment, the UWB device 230 may receive authentication data including authentication information from the first electronic device 210 or receive, for example, authentication data and authentication information (e.g., at least one piece of provision condition information, receiver information, security procedure information, and/or use condition information) from the first electronic device 210.

According to an embodiment, the UWB device 230 may identify authentication information (e.g., provision condition information, receiver information, security procedure information, and/or use condition information). FIG. 5 illustrates that the UWB device 230 sequentially performs operation 503, operation 505, operation 507, and operation 509 as an example of the operation of identifying authentication information, but it is only an example and there is no limit in the order of operations 503, 505, 507, and 509. Further, at least one of operations 503, 505, 507, and 509 may be omitted.

In operation 503, the UWB device 230 according to various embodiments may identify provision condition information. According to an embodiment, the UWB device 230 may identify provision condition information received from the first electronic device 210. According to an embodiment, the UWB device 230 may identify provision condition information configured on the basis of a predetermined configuration in the UWB device 230. According to an embodiment, the UWB device 230 may determine whether the second electronic device 220 satisfies provision conditions through a communication module (e.g., a communication module implemented to be the same as the wireless communication module 192 of FIG. 1 or a communication module including at least some of at least one hardware included in the wireless communication module 192) supporting a UWB communication scheme of the UWB device 230 on the basis of the identified provision condition information. For example, the UWB device 230 may determine whether a state in which the second electronic device 220 faces the UWB device 230 satisfies the provision conditions on the basis of the provision condition information. For example, the UWB device 230 may determine whether the relative location between the UWB device 230 and the second electronic device 220 is included in a reference range (e.g., a reference distance and/or a reference angle) on the basis of the provision condition information. For example, the UWB device 230 may determine whether the state in which the relative location between the UWB device 230 and the second electronic device 220 is included in the reference range (e.g., the reference distance and/or the reference angle) continues for a reference time on the basis of the provision condition information. For example, the UWB device 230 may perform operation 511 on the basis of at least the second electronic device 220 satisfying the provision conditions. For example, the UWB device 230 may perform operation 505, operation 507, and/or operation 509 on the basis of at least the second electronic device 220 satisfying the provision conditions. For example, the UWB device 230 may not perform an additional authentication procedure (e.g., a procedure of determining whether the second electronic device 220 is a target to issue authentication data on the basis of the authentication information) on the basis of the second electronic device 220 dissatisfying the provision conditions.

In operation 505, the UWB device 230 according to various embodiments may identify receiver information. For example, the UWB device 230 may receive identification information (e.g., identification information of the second electronic device 220 or identification information of the user of the second electronic device 220) from the second electronic device 220. The UWB device 230 may receive receiver information (e.g., identification information of a user which is a target to issue action information (or authentication data) (e.g., a unique identifier of the user) or identification information of a device which is a target to issue (e.g., a unique identifier of the device)) from the first electronic device 210. For example, the UWB device 230 may determine whether the second electronic device 220 is a target to issue authentication data on the basis of the identification information received from the second electronic device 220 and the receiver information received from the first electronic device 210. For example, the UWB device 230 may identify that the second electronic device 220 is a target to issue authentication data on the basis of the identification information received from the second electronic device 220, which is included in the receiver information received from the first electronic device 210.

In operation 507, the UWB device 230 according to various embodiments may identify use condition information. According to an embodiment, the UWB device 230 may receive use condition information related to the issue of the authentication data (e.g., information on a period during which the authentication data can be issued and/or the number of times the authentication data can be issued) from the first electronic device 210. For example, the UWB device 230 may determine whether to transmit authentication data to the second electronic device 220 on the basis of at least the use condition information related to the issue of the authentication data.

In operation 509, the UWB device 230 according to various embodiments may identify security procedure information. According to an embodiment, the UWB device 230 may receive information on an additional security procedure (e.g., information on a password, a gesture, a pattern, or biometric authentication) required for issuing authentication data from the first electronic device 210. For example, the UWB device 230 may perform the security procedure for the second electronic device 220 on the basis of the security procedure information received from the first electronic device 210. For example, the UWB device 230 may determine whether to transmit authentication data to the second electronic device 220 on the basis of at least the result of the security procedure for the second electronic device 220. The performance of the security procedure is described below with reference to FIGS. 11 and 12.

In operation 511, the UWB device 230 according to various embodiments may determine whether to perform operation 511 according to the result of operation 503, operation 505, operation 507, and/or operation 509. For example, the UWB device 230 may perform operation 503, operation 505, operation 507, and/or operation 509 on the basis of the authentication information and transmit the authentication data to the second electronic device 220 on the basis of the second electronic device 220 corresponding to a target to issue the authentication data as the result of operation 503, operation 505, operation 507, and/or operation 509.

Figure 6:
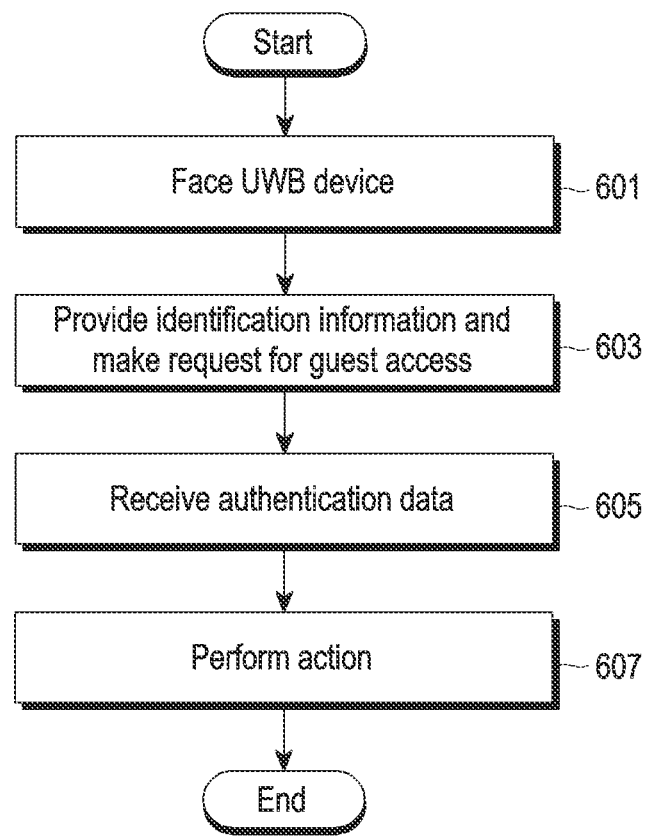
FIG. 6 is a flowchart illustrating an operation of an electronic device within a network environment according to an embodiment of the disclosure.

FIG. 6 is a flowchart illustrating an operation of an electronic device within a network environment according to an embodiment of the disclosure. FIG. 6 is described with reference to FIGS. 2 and 3. The operation of the second electronic device 220 of FIG. 2 may be understood with reference to FIG. 6.

Referring to FIG. 6, in operation 601, the second electronic device 220 according to various embodiments may face the UWB device 230. For example, the second electronic device 220 (e.g., the processor (e.g., 120 of FIG. 1) of the second electronic device 220) may transmit and receive messages of a UWB communication scheme (e.g., a broadcast signal, a ranging poll message (or a ranging initiation message), a ranging response message, and/or a ranging final message of the UWB communication scheme) to and from the UWB device 230 through a communication module (e.g., a communication module implemented to be the same as the wireless communication module 192 of FIG. 1 or a communication module including at least some of at least one hardware included in the wireless communication module 192) supporting the UWB communication scheme of the second electronic device 220 in the state in which the second electronic device 220 faces the UWB device 230. According to an embodiment, the UWB device 230 may determine whether the state in which the second electronic device 220 faces the UWB device 230 satisfies provision conditions on the basis of the message of the UWB communication scheme transmitted and received to and from the second electronic device 220 as described above.

In operation 603, the second electronic device 220 according to various embodiments may transmit identification information (e.g., identification information of the second electronic device 220 or identification information of the user of the second electronic device 220) through at least one of the at least one communication module (e.g., the communication modules 190 of FIG. 1) of the second electronic device 220 to the UWB device 230 and make a request for guest access. The request for guest access by the second electronic device 220 may be a request for authentication data which can be issued to the second electronic device 220 by providing identification information to the UWB device 230 by the second electronic device 220.

In operation 605, the second electronic device 220 according to various embodiments may receive authentication data from the UWB device 230 through at least one of the at least one communication module (e.g., the communication modules 190 of FIG. 1) of the second electronic device 220. For example, the second electronic device 220 may receive authentication data from the UWB device 230 on the basis of authentication of the second electronic device 220 in the UWB device 230 based on authentication information.

In operation 607, the second electronic device 220 according to various embodiments may perform an action on the basis of the authentication data. For example, the second electronic device 220 may control another device (e.g., the UWB device 230 or another UWB device (not shown) different from the UWB device 230) according to a control right corresponding to the authentication data on the basis of the authentication data. In another example, the second electronic device 220 may execute a content file corresponding to the authentication data on the basis of the authentication data. The operation in which the second electronic device 220 performs the action on the basis of the authentication data is described below with reference to FIG. 8.

Figure 7:
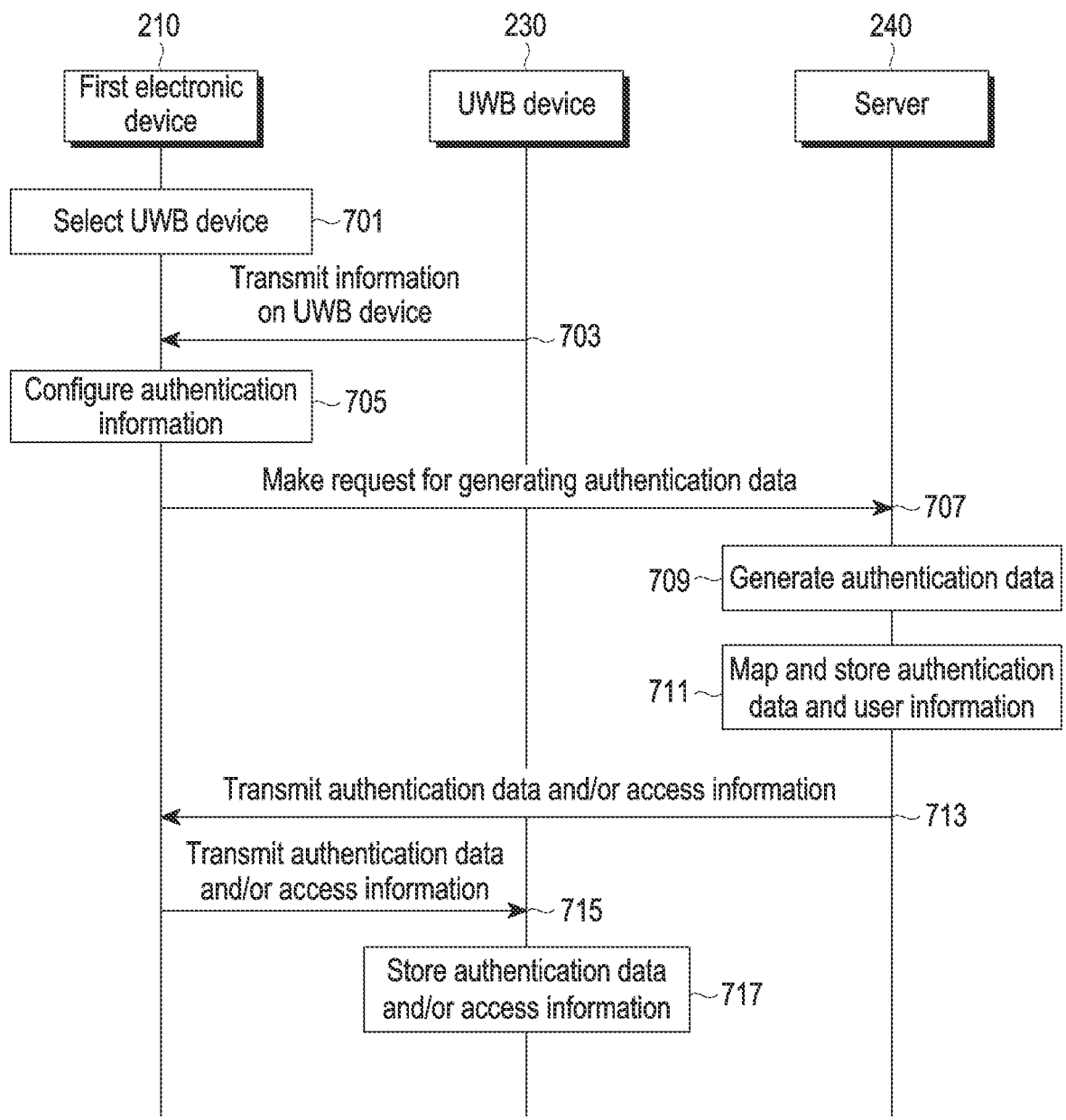
FIG. 7 is a flowchart illustrating an operation of an electronic device within a network environment according to an embodiment of the disclosure.

FIG. 7 is a flowchart illustrating an operation of an electronic device within a network environment according to an embodiment of the disclosure. FIG. 7 is described with reference to FIGS. 2 and 3. The operation between the first electronic device 210, the UWB device 230, and the server 240 of FIG. 2 may be understood with reference to FIG. 7.

Referring to FIG. 7, in operation 701, the first electronic device 210 according to various embodiments (e.g., the processor (e.g., 120 of FIG. 1) of the first electronic device 210) may select the UWB device 230. For example, the first electronic device 210 may select the UWB device 230 on the basis of selection of an object corresponding to the UWB device 230 in a screen displayed on the display (e.g., the display module 160 of FIG. 1) of the first electronic device 210. The operation in which the first electronic device 210 selects the UWB device 230 is described below with reference to FIG. 9.

In operation 703, the first electronic device 210 according to various embodiments may acquire information on the UWB device 230 from the UWB device 230. The operation in which the first electronic device 210 acquires information on the UWB device 230 has been described in operation 401. For example, the first electronic device 210 may receive information on the UWB device 230 (e.g., a unique identifier of the UWB device 230) from the UWB device 230 through a communication module (e.g., the wireless communication module 192 of FIG. 1) supporting the UWB communication scheme among the at least one communicate module of the first electronic device 210 (e.g., the communication modules 190 of FIG. 1) in the state in which a state where the first electronic device 210 faces the UWB device 230 is included in a preset condition (e.g., the relative distance between the first electronic device 210 and the UWB device 230 is included in a reference range (e.g., a reference distance, a reference direction, and/or a reference angle)).

In operation 705, the first electronic device 210 according to various embodiments may configure authentication information and/or action information. The operation in which the first electronic device 210 configures authentication information and/or action information has been described in operation 403. For example, the first electronic device 210 may configure authentication information used for authenticating another electronic device (e.g., the second electronic device 220) by the UWB device 230. For example, the first electronic device 210 may configure action information, and then when the UWB device 230 transmits authentication data to another electronic device (e.g., the second electronic device 220) authentication on the basis of authentication of another electronic device (e.g., the second electronic device 220), the other authenticated electronic device (e.g., the second electronic device 220) may acquire action information configured in the first electronic device 210 on the basis of authentication data. The operation in which the first electronic device 210 configures authentication information and/or action information is described below with reference to FIG. 9.

In operation 707, the first electronic device 210 according to various embodiments may transmit a signal making a request for generating authentication data to the server 240 through at least one of the at least one communication module (e.g., the communication modules 190 of FIG. 1) of the first electronic device 210. The operation in which the first electronic device 210 makes a request for generating authentication data to the server 240 has been described in operation 407. For example, the first electronic device 210 may make a request for generating authentication data by transmitting a signal including information on the UWB device 230, action information, authentication information, and/or identification information of the first electronic device 210 (e.g., a unique identifier of the first electronic device 210 and/or a unique identifier of the user of the first electronic device 210) to the server 240.

In operation 709, the server 240 according to various embodiments may generate authentication data on the basis of the signal received from the first electronic device 210. For example, the server 240 may generate authentication data by using the information on the UWB device 230, the action information, the authentication information, and/or the identification information of the first electronic device 210 (e.g., the unique identifier of the first electronic device 210 and/or the unique identifier of the user of the first electronic device 210). There is no limit in the type and the configuration of generated authentication data.

In operation 711, the server 240 according to various embodiments may generate authentication data and map user information associated with the authentication data (e.g., identification information of the first electronic device 210 (e.g., the unique identifier of the first electronic device 210 and/or the unique identifier of the user of the first electronic device 210)), and/or action information corresponding to the authentication data to the authentication data and store the same. For example, the authentication data generated by the server 240 may be used to acquire action information corresponding to the authentication data by another electronic device (e.g., the second electronic device 220). For example, the server 240 may transmit action information corresponding to the authentication data to the corresponding device (e.g., the second electronic device 220) by a request from another electronic device (e.g., the second electronic device 220) issuing the authentication data, which will be described below with reference to FIG. 8.

In operation 713, the server 240 according to various embodiments may transmit authentication data and/or access information to the first electronic device 210. For example, the first electronic device 210 may receive authentication data and/or access information from the server 240 through at least one of the at least one communication module of the first electronic device 210 (e.g., the communication modules 190 of FIG. 1). For example, when the server 240 transmits authentication data to the first electronic device 210, the server 240 may transmit access information for action information corresponding to the authentication data to the first electronic device 210. For example, the access information for the action information may be location information of the action information stored in the server 240 (e.g., an access address for a location or an area in which the action information is stored). According to an embodiment, the authentication data may include access information, and the authentication data and the access information may be configured in separate forms. In another example, when the server 240 transmits only the access information to the first electronic device 210, the server 240 may transmit the access information for the authentication data to the first electronic device 210. For example, the access information for the authentication data may be location information of the authentication data stored in the server 240 (e.g., the access address for the location or the area in which the authentication data is stored).

In operation 715, the first electronic device 210 according to various embodiments may transmit authentication data and/or access information to the UWB device 230. The operation in which the first electronic device 210 transmits authentication data to the UWB device 230 has been described in operation 411. For example, the first electronic device 210 may transmit authentication data and/or access information to the UWB device 230 through a communication module (e.g., the wireless communication module 192 of FIG. 1) supporting a UWB communication scheme among the at least one communication module of the first electronic device 210 (e.g., the communication modules 190 of FIG. 1) in the state in which a state where the first electronic device 210 faces the UWB device 230 is included in a preset condition (e.g., the relative location between the first electronic device 210 an the UWB device 230 is included in a reference range (e.g., a reference distance, a reference direction, and/or a reference angle)). According to another embodiment, the first electronic device 210 may transmit the authentication information to the UWB device 230.

In operation 715, the UWB device 230 according to various embodiments may store the authentication data and/or the access information received from the first electronic device 210. According to an embodiment, the UWB device 230 may store the authentication information received from the first electronic device 210.

Figure 8:
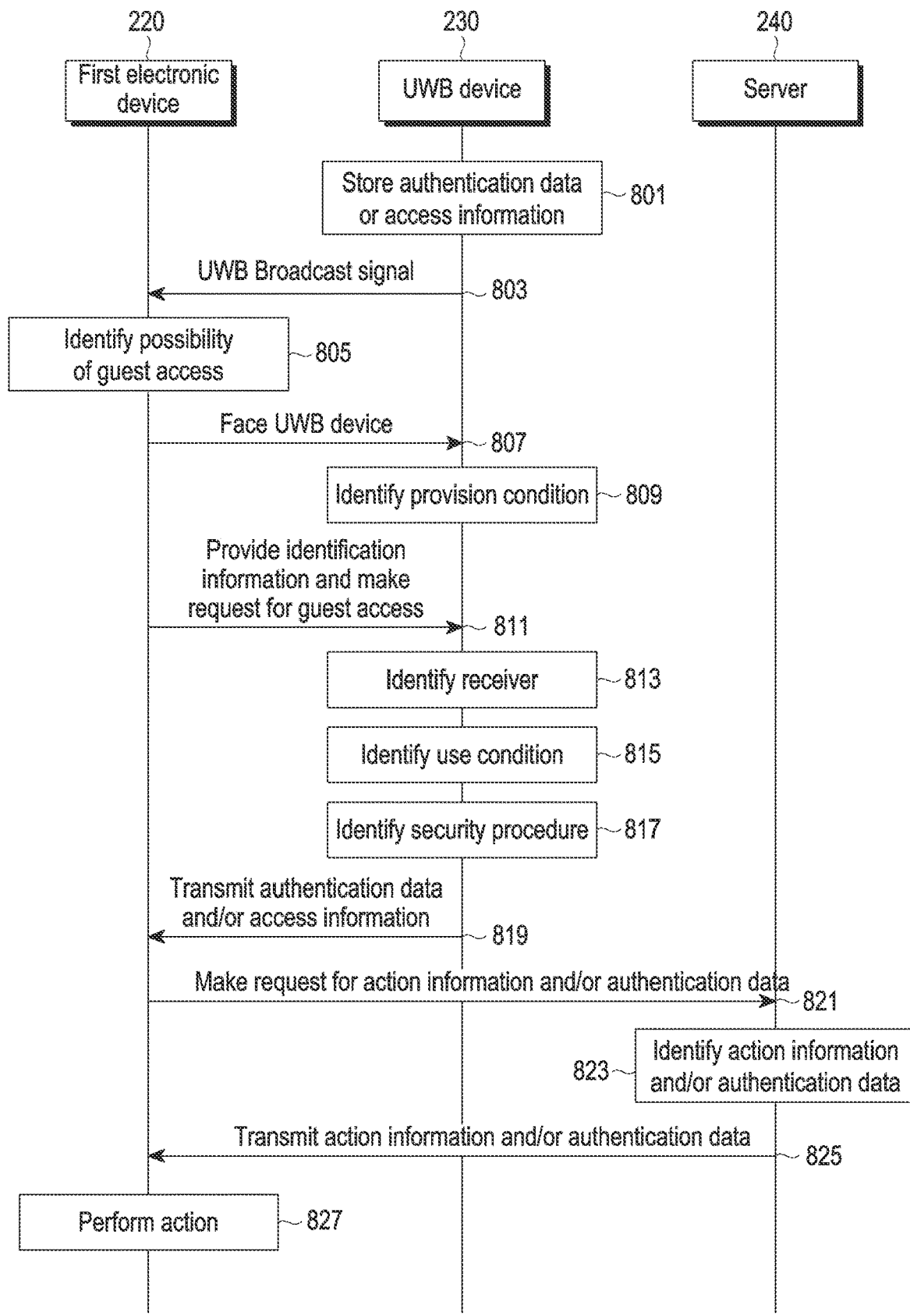
FIG. 8 is a flowchart illustrating an operation of an electronic device within a network environment according to an embodiment of the disclosure.

FIG. 8 is a flowchart illustrating an operation of an electronic device within a network environment according to an embodiment of the disclosure. FIG. 8 is described with reference to FIGS. 2 and 3. The operation between the second electronic device 220, the UWB device 230, and the server 240 of FIG. 2 may be understood with reference to FIG. 8.

Referring to FIG. 8, in operation 801, the UWB device 230 (e.g., the processor of the UWB device 230 (e.g., the processor 120 of FIG. 1)) according to various embodiments may store the authentication data and/or the access information, which has been described in operation 717.

In operation 803, the UWB device 230 according to various embodiments may output a signal of a UWB communication scheme (e.g., a UWB broadcast signal) through a communication module (e.g., the wireless communication module 192 of FIG. 1) supporting the UWB communication scheme among the at least one communication module of the UWB device 230 (e.g., the communication modules 190 of FIG. 1).

In operation 805, the second electronic device 220 (e.g., the processor of the second electronic device 220 (e.g., the processor 120 of FIG. 1)) according to various embodiments may identify possibility of guest access on the basis of the signal of the UWB communication scheme (e.g., UWB broadcast signal) output from the UWB device 230. The possibility of the guest access may mean a possibility of receiving authentication data and/or access information from the corresponding UWB device (e.g., the UWB device 230).

In operation 807, the second electronic device 220 according to various embodiments may face the UWB device 230. Operation 807 may be understood to be similar to operation 601. There is no limit in the order of operation 805 and operation 807. Operation 807 may be performed after operation 805 according to an embodiment, and operation 805 may be performed after operation 807 according to another embodiment. For example, after the UWB device 230 faces the second electronic device 220, the second electronic device 220 may identify a possibility of the guest access related to the UWB device 230.

In operation 809, the UWB device 230 according to various embodiments may identify whether the second electronic device 220 satisfies provision conditions on the basis of the provision condition information. Operation 809 may be understood to be similar to operation 503.

In operation 811, the second electronic device 220 according to various embodiments may transmit identification information (e.g., identification information of the second electronic device 220 or identification information of the user of the second electronic device 220) through at least one of the at least one communication module (e.g., the communication module 190 of FIG. 1) of the second electronic device 220 to the UWB device 230 and make a request for guest access. Operation 811 may be understood to be similar to operation 603. For example, the second electronic device 220 may transmit identification information to the UWB device 230 through a communication module (e.g., the wireless communication module 192 of FIG. 1) supporting a UWB communication scheme among at least one communication module (e.g., the communication modules 190 of FIG. 1) of the second electronic device 220 in the state in which a state in which the second electronic device 220 faces the UWB device 230 is included in a preset condition (e.g., the relative location between the second electronic device 220 and the UWB device 230 is included in a reference range (e.g., a reference distance, a reference direction, and/or a reference angle)).

In operation 813, the UWB device 230 according to various embodiments may identify receiver information. Operation 813 may be understood to be similar to operation 505.

In operation 815, the UWB device 230 according to various embodiments may identify use condition information. Operation 815 may be understood to be similar to operation 507.

In operation 817, the UWB device 230 according to various embodiments may identify security procedure information. Operation 817 may be understood to be similar to operation 509.

In operation 819, the UWB device 230 according to various embodiments may transmit authentication data and/or access information to the second electronic device 220 on the basis of identification that the second electronic device 220 is target to issue the authentication data and/or the access information. For example, the second electronic device 220 may receive authentication data and/or access information from the UWB device 230 through a communication module (e.g., the wireless communication module 192 of FIG. 1) supporting a UWB communication scheme among at least one communication module (e.g., the communication modules 190 of FIG. 1) of the second electronic device 220 in the state in which a state in which the second electronic device 220 faces the UWB device 230 is included in a preset condition (e.g., the relative location between the second electronic device 220 and the UWB device 230 is included in a reference range (e.g., a reference distance, a reference direction, and/or a reference angle)).

In operation 821, the second electronic device 220 according to various embodiments may make a request for action information or authentication data to the server 240. For example, the second electronic device 220 may make a request for transmitting action information to the server 240 on the basis of authentication data and access information (e.g., access information for the action information). In another example, the second electronic device 220 may make a request for transmitting authentication data to the server 240 on the basis of access information (e.g., access information for the authentication data).

In operation 823, the server 240 according to various embodiments may identify action information or authentication data on the basis of the request from the second electronic device 220.

In operation 825, the server 240 according to various embodiments may transmit the identified action information or authentication data to the second electronic device 220. For example, when the second electronic device 220 receives authentication data from the server 240, the second electronic device 220 may perform operation 821 on the basis of the authentication data.

In operation 827, the second electronic device 220 according to various embodiments may perform an action on the basis of the action information received from the server 240. For example, when receiving a content file from the server 240, the second electronic device 220 may execute the content file through an application corresponding to the content file. In another example, when receiving a control right from the server 240, the second electronic device 220 may control another electronic device (e.g., the UWB device 230 or another UWB device 230 different from the UWB device 230) which is a target to be controlled. For example, the second electronic device 220 may control the UWB device 230 on the basis of the control right. For example, the UWB device 230 may identify a direction in which the second electronic device 220 is located (e.g., a first direction) through a communication module (e.g., the wireless communication module 192 of FIG. 1) supporting a UWB communication scheme among at least one communication modules (e.g., the communication modules 190 of FIG. 1) of the UWB device 230. For example, the UWB device 230 may perform a function corresponding to a control signal in the direction in which the second electronic device 220 is located (e.g., the first direction) on the basis of reception of the control signal from the second electronic device 220 acquiring the right to control the UWB device 230. For example, when the UWB device 230 is a speaker device, the UWB device 230 may control an output of the speaker to face the direction in which the second electronic device 220 is located (e.g., the first direction) on the basis of reception of the control signal from the second electronic device 220 acquiring the right to control the UWB device 230. For example, when the UWB device 230 is an air-conditioner device, the UWB device 230 may control an output of wind to face the direction in which the second electronic device 220 is located (e.g., the first direction) on the basis of reception of the control signal from the second electronic device 220 acquiring the right to control the UWB device 230.

Figure 9:
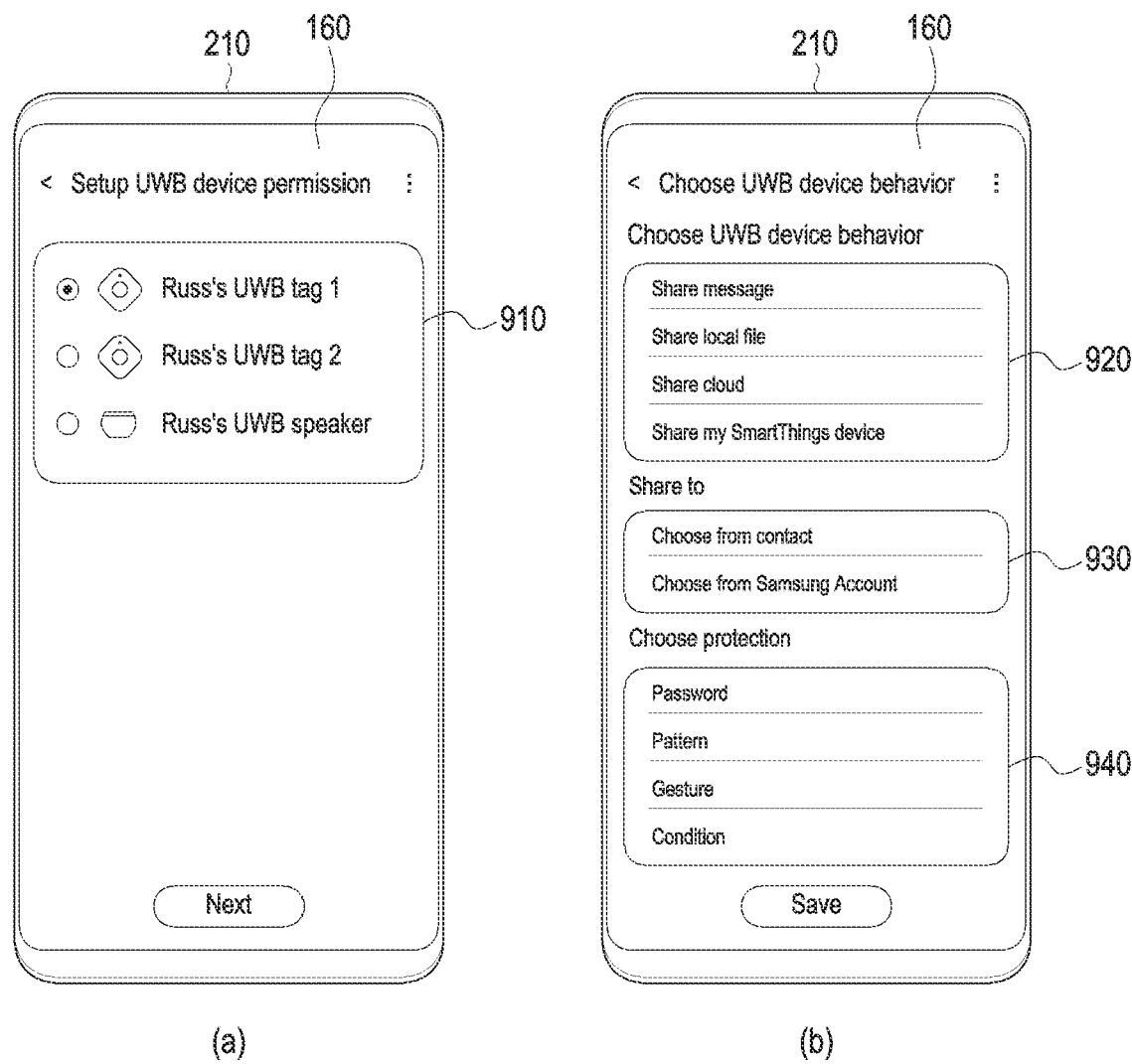
FIG. 9 illustrates an operation of an electronic device within a network environment according to an embodiment of the disclosure.

FIG. 9 illustrates an operation of the electronic device within the network environment according to an embodiment of the disclosure. FIG. 9 is described with reference to FIGS. 2 and 3. The operation of the first electronic device 210 of FIG. 2 may be understood with reference to FIG. 9.

Referring to part (a) of FIG. 9, the first electronic device 210 (e.g., the processor (e.g., the processor 120 of FIG. 1) of the first electronic device 210) according to various embodiments may display a screen (e.g., 910) for selecting a UWB device (e.g., the UWB device 230) on a display (e.g., the display module 160 of FIG. 1) of the first electronic device 210. For example, the first electronic device 210 may select the UWB device 230 on the basis of selection of an object corresponding to the UWB device 230 in the screen (e.g., 910) for selecting the UWB device (e.g., the UWB device 230).

Referring to part (b) of FIG. 9, the first electronic device 210 according to various embodiments may display a screen (e.g., 920) for selecting action information and/or a screen for selecting authentication information (e.g., a screen 930 for selecting a receiver who is a target to issue authentication data and/or a screen 940 for selecting security procedure information) on the display of the first electronic device 210 (e.g., the display module 160 of FIG. 1). For example, the first electronic device 210 may configure action information and/or authentication information on the basis of selection of at least one object from among objects included in the screens (e.g., 920, 930, and/or 940).

Figure 10:
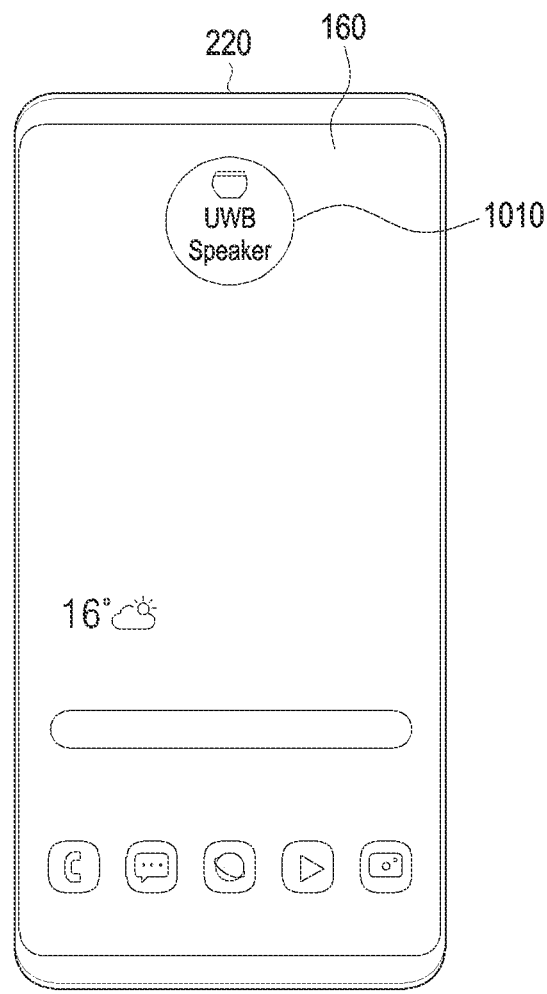
FIG. 10 illustrates an operation of an electronic device within a network environment according to an embodiment of the disclosure.

FIG. 10 illustrates an operation of the electronic device within the network environment according to an embodiment of the disclosure.

Figure 11:
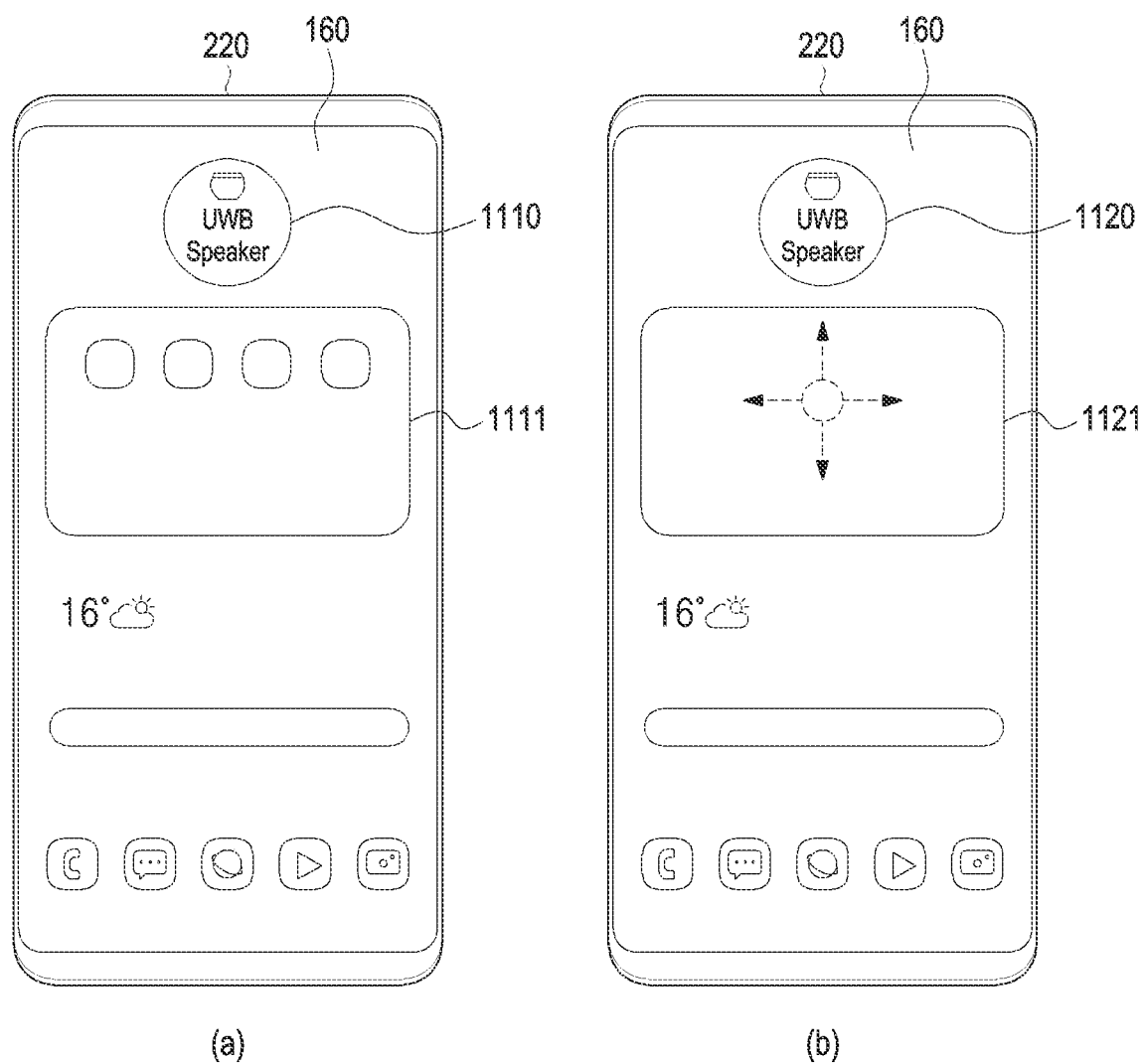
FIG. 11 illustrates an operation of an electronic device within a network environment according to an embodiment of the disclosure.

FIG. 11 illustrates an operation of the electronic device within the network environment according to an embodiment of the disclosure.

Figure 12:
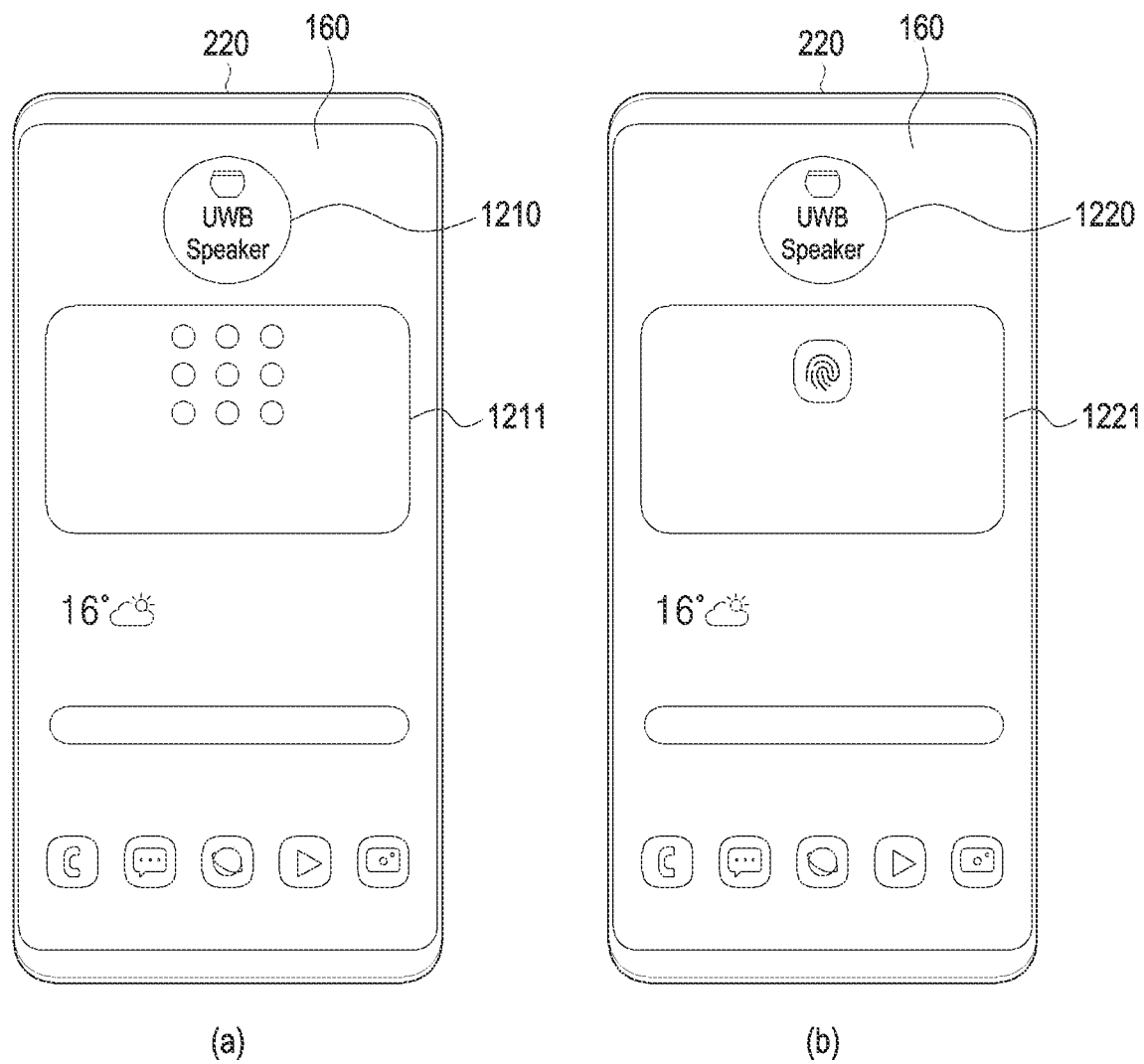
FIG. 12 illustrates an operation of an electronic device within a network environment according to an embodiment of the disclosure.

FIG. 12 illustrates an operation of the electronic device within the network environment according to an embodiment of the disclosure.

FIGS. 10, 11, and 12 are described with reference to FIGS. 2 and 3. The operation of the second electronic device 220 of FIG. 2 may be understood with reference to FIGS. 10, 11, and 12.

Referring to FIG. 10, when a UWB device (e.g., the UWB device 320) is recognized, the second electronic device 220 (e.g., the processor (e.g., the processor 120 of FIG. 1) of the second electronic device 220) according to various embodiments may display an object (e.g., 1010) indicating that the UWB device (e.g., the UWB device 320) is recognized on the display of the second electronic device 220 (e.g., the display module 160 of FIG. 1). According to an embodiment, the second electronic device 200 may display only an object (e.g., 1010) indicating that the UWB device (e.g., the UWB device 320) is recognized as illustrated in FIG. 10 on the basis of non-reception of a request for performing a security procedure from the recognized UWB device (e.g., the UWB device 320).

Referring to FIGS. 11 and 12, the second electronic device 220 (e.g., the processor (e.g., the processor 120 of FIG. 1) of the second electronic device 220) according to various embodiments may display a screen (e.g., 1111 or 1121 of FIG. 11 or 1211 or 1221 of FIG. 12) for performing a security procedure as illustrated in FIGS. 11 and 12 on the basis of reception of a request for performing the security procedure from the recognized UWB device (e.g., the UWB device 320).

Referring to part (a) of FIG. 11, the second electronic device 220 according to various embodiments may display an object 1110 indicating that the UWB device (e.g., the UWB device 320) is recognized and a screen (e.g., 1111) for performing a security procedure (e.g., inputting of a password) requested by the recognized UWB device (e.g., the UWB device 320).

Referring to part (b) of FIG. 11, the second electronic device 220 according to various embodiments may display an object 1120 indicating that the UWB device (e.g., the UWB device 320) is recognized and a screen (e.g., 1121) for performing a security procedure (e.g., inputting of a gesture) requested by the recognized UWB device (e.g., the UWB device 320).

Referring to part (a) of FIG. 12, the second electronic device 220 according to various embodiments may display an object 1210 indicating that the UWB device (e.g., the UWB device 320) is recognized and a screen (e.g., 1211) for performing a security procedure (e.g., inputting of a pattern) requested by the recognized UWB device (e.g., the UWB device 320).

Referring to part (b) of FIG. 12, the second electronic device 220 according to various embodiments may display an object 1220 indicating that the UWB device (e.g., the UWB device 320) is recognized and a screen (e.g., 1221) for performing a security procedure (e.g., biometric authentication) requested by the recognized UWB device (e.g., the UWB device 320). The above-described security procedures are only examples, and there is no limit in the type of security procedures.

It can be understood by those skilled in the art that various embodiments disclosed in the specification are organically applied within an applicable range. For example, it can be understood by those skilled in the art that at least some operations according to an embodiment disclosed in the specification may be omitted and applied and at least some operations according to an embodiment and at least some operations according to another embodiment are organically connected and applied.

According to various embodiments, an electronic device (e.g., the electronic device 101 or the first electronic device 210) may include at least one communication module (e.g., the communication modules 190 of FIG. 1) and a processor (e.g., the processor 120 of FIG. 1), and the processor may be configured to select an external device (e.g., the UWB device 230 or an electronic device (not shown) supporting an IEEE 802.11ad/ay scheme of a Wi-Fi 60 Ghz band) supporting a directional communication scheme, acquire a first identifier of the selected external device through at least one of the at least one communication module, configure action information and authentication information, and transmit authentication data generated based on the first identifier, the action information, and the authentication information to the external device through at least one of the at least one communication module.

According to various embodiments, the processor may be configured to acquire the first identifier of the external device from the external device (e.g., the UWB device 230) through a first communication module (e.g., the wireless communication module 192 of FIG. 1) supporting an ultra-wideband (UWB) communication scheme among the at least one communication module in a state in which the electronic device faces the external device satisfies a preset condition, and transmit the authentication data to the external device through the first communication module in a state in which the state where the electronic device faces the external device satisfies the preset condition.

According to various embodiments, the processor may be configured to transmit a request signal including the first identifier, the action information, and the authentication information to a server (e.g., the server 108 or the server 240) through at least one of the at least one communication module, receive the authentication data generated based on the first identifier, the action information, and the authentication information by the server from the server through at least one of the at least one communication module, and transmit the received authentication data to the external device through at least one of the at least one communication module.

According to various embodiments, the processor may be configured to generate the authentication data, based on the first identifier, the action information, and the authentication information, and transmit the generated authentication data to the external device through at least one of the at least one communication module.

According to various embodiments, the authentication information may include at least one piece of provision condition information, security procedure information, or receiver information, and the authentication information may be used for authenticating another external device by the external device.

According to various embodiments, the provision condition information may include information on a reference range for a relative location between the external device and the other external device and/or a reference time, and the external device may transmit the authentication data to the other external device, based on the relative location between the external device and the other external device that satisfies the reference range and/or the reference time.

According to various embodiments, the action information may include at least one of information on a control right or a content file.

According to various embodiments, an electronic device (e.g., the UWB device 230 or another electronic device (not shown) supporting an IEEE 802.11ad/ay scheme of a Wi-Fi 60 Ghz band) may include at least one communication module (e.g., at least one communication module (e.g., 190 of FIG. 1) of another electronic device (not shown) or the UWB device 230), and a processor (e.g., a processor (e.g., 120 of FIG. 1 of another electronic device (not shown) or the UWB device 230)), wherein the processor is configured to transmit a first identifier of the electronic device to a first external device (e.g., the electronic device 101 or the first electronic device 210) through at least one of the at least one communication module, receive authentication data generated based on the first identifier, and action information and authentication information configured in the first external device from the first external device through at least one of the at least one communication module, determine whether a state in which a second external device (e.g., the electronic device 101 or the second electronic device 220) faces the electronic device satisfies a first condition through a first communication module (e.g., a communication module (e.g., 192 of FIG. 1) of another electronic device (not shown) or the UWB device 230) supporting a directional communication scheme (e.g., a UWB communication scheme or an IEEE 802.11ad/ay scheme of a Wi-Fi 60 Ghz band) among the at least one communication module, authenticating the second external device, based on the authentication information and identification information received from the second external device according to satisfaction of the first condition by the state in which the second external device faces the electronic device, and transmit the authentication data to the second external device through at least one of the at least one communication module, based on the authentication of the second external device.

According to various embodiments, the processor may be configured to transmit the first identifier to the first external device through the first communication module supporting an ultra-wideband (UWB) communication scheme in a state in which a state where the first external device faces the electronic device satisfies a preset condition, and receive the authentication data from the first external device through the first communication module in the state in which the state where the first external device faces the electronic device satisfies the preset condition.

According to various embodiments, the authentication information may include at least one piece of provision condition information, security procedure information, or receiver information.

According to various embodiments, the provision condition information may include information on a reference range for a relative location between the electronic device and the second external device and/or a reference time, and the processor may be configured to determine whether the state in which the second external device faces the electronic device satisfies the first condition, based on the provision condition information.

According to various embodiments, the processor may be configured to determine that the first condition is satisfied, based on continuing of the state in which the relative location between the electronic device and the second external device is included in the reference range for the reference time.

According to various embodiments, the processor may be configured to determine whether the second external device is a target to issue the authentication data, based on the identification information and the receiver information.

According to various embodiments, the action information may include information on a control right, and the processor may be configured to identify a first direction in which the second external device is located through the first communication module, and perform a first function of the electronic device in the first direction, based on reception of a control signal from the second external device acquiring the control right.

According to various embodiments, the electronic device may be a speaker device (e.g., 320 of FIG. 3) and the processor may be configured to control an output of the speaker to face the first direction in which the second external device is located, based on reception of the control signal.

According to various embodiments, an electronic device (e.g., the electronic device 101 or the second electronic device 220) may include at least one communication module (e.g., the communication modules 190 of FIG. 1) and a processor (e.g., the processor 120 of FIG. 1), and the processor may be configured to identify a first external device (e.g., the UWB device 230 or an electronic device (not shown) supporting an IEEE 802.11ad/ay scheme of a Wi-Fi 60 Ghz band) supporting a directional communication scheme (e.g., a UWB communication scheme or an IEEE 802.11ad/ay scheme of a Wi-Fi 60 Ghz band) through a first communication module (e.g., the wireless communication module 192 of FIG. 1) supporting the directional communication scheme among the at least one communication module, transmit identification information to the first external device through at least one of the at least one communication module, based on satisfaction of a first condition by a state in which the electronic device faces the first external device, and receive authentication data from the first external device through at least one of the at least one communication module, based on authentication of the electronic device based on the identification information and authentication information stored in the first external device.

According to various embodiments, the processor may be configured to transmit the identification information to the first external device through the first communication module supporting an ultra-wideband (UWB) communication scheme, based on satisfaction of the first condition by the state in which the electronic device faces the first external device, and receive the authentication data from the first external device through the first communication module, based on satisfaction of a preset condition by the state in which the electronic device faces the first external device.

According to various embodiments, the processor may be configured to make a request for transmitting a content file to a server (e.g., the server 108 of the server 240) storing the content file corresponding to the authentication data through at least one of the at least one communication module, based on the authentication data, and receive the content file from the server through at least one of the at least one communication module.

According to various embodiments, the processor may be configured to make a request for transmitting information on a control right to a server storing information on the control right corresponding to the authentication data through at least one of the at least one communication module, based on the authentication data, and receive the information on the control right from the server through at least one of the at least one communication module.

According to various embodiments, the processor may be configured to control the first external device or a second external device (e.g., the UWB device 230, the UWB device 320, or another electronic device (not shown) supporting an IEEE 802.11ad/ay scheme of a Wi-Fi 60 Ghz band) different from the first external device, based on the control right.

According to various embodiments, the processor may be configured to cause the second external device to display an object indicating that an ultra-wideband (UWB) device is recognized for performing a security procedure requested by the UWB device.

According to various embodiments, a content file may be executed through an application of a second external device based on a result of the security procedure.

According to various embodiments, the content file may be at least one of a video file, an audio file or a text file.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
at least one communication circuit;
at least one processor; and
memory storing instructions,
wherein the instructions, when executed by the at least one processor individually or collectively, cause the electronic device to:
select an external device,
acquire a first identifier of the selected external device through at least one of the at least one communication circuit,
configure action information and authentication information, and
provide, to the selected external device, the action information, and the authentication information, wherein the authentication information is configured to cause the selected external device to authenticate a second external device, and wherein the action information is configured to cause the second external device to perform a control operation based on a control right, or to output a content file.

2. The electronic device of claim 1,
wherein the instructions, when executed by the at least one processor individually or collectively, is configured cause the electronic device to:
acquire the first identifier of the selected external device from the selected external device through a first communication circuit supporting an ultra-wideband (UWB) communication scheme among the at least one communication circuit in a state in which a state where the electronic device faces the external device satisfies a preset condition, and
transmit the action information and the authentication information to the selected external device through the first communication circuit in a state in which the state where the electronic device faces the selected external device satisfies the preset condition.

3. The electronic device of claim 1, wherein the instructions, when executed by the at least one processor individually or collectively, is configured cause the electronic device to:
transmit a request signal comprising the first identifier, the action information; and the authentication information to a server through the at least one communication circuit,
receive authentication data generated based on the first identifier, the action information and the authentication information by the server from the server through the at least one communication circuit, and
transmit the received authentication data to the selected external device through at least one of the at least one communication circuit.

4. The electronic device of claim 1, wherein the instructions, when executed by the at least one processor individually or collectively, is configured cause the electronic device to:
generate authentication data based on the first identifier, the action information and the authentication information, and
transmit the generated authentication data to the selected external device through at least one of the at least one communication circuit.

5. The electronic device of claim 1,
wherein the authentication information comprises at least one piece of provision condition information, security procedure information, or receiver information.

6. The electronic device of claim 5,
wherein the provision condition information comprises at least one of:
information on a reference range for a relative location between the selected external device and the second external device, or
a reference time, and
wherein the selected external device transmits authentication data to the second external device, based on at least one of:
the relative location between the selected external device and the second external device that satisfies the reference range, or
the reference time.

7. The electronic device of claim 1, wherein the action information comprises at least one of information on the control right or the content file.

8. A directional communication device comprising:
at least one communication circuit;
at least one processor; and
memory storing instructions,
wherein the instructions, when executed by the at least one processor individually or collectively, cause the directional communication device to:
transmit a first identifier of the directional communication device to a first external device through the at least one communication circuit,
receive, through at least one communication circuit, action information and authentication information configured in the first external device,
determine whether a state in which a second external device faces the directional communication device satisfies a first condition through a first communication circuit supporting a directional communication scheme among the at least one communication circuit,
authenticating the second external device, based on the authentication information and identification information received from the second external device according to a satisfaction of the first condition by the state in which the second external device faces the directional communication device, and
transmit the action information to the second external device through the at least one communication circuit, based on the authentication of the second external device,
wherein the action information is configured to cause the second external device to perform a control operation based on a control right, or to output a content file.

9. The directional communication device of claim 8,
wherein the instructions, when executed by the at least one processor individually or collectively, is further configured to cause the directional communication device to:
transmit the first identifier to the first external device through the first communication circuit supporting an ultra-wideband (UWB) communication scheme in a state in which a state where the first external device faces the directional communication device satisfies a preset condition, and
receive the action information and the authentication information from the first external device through the first communication circuit in the state in which the state where the first external device faces the directional communication device satisfies the preset condition.

10. The directional communication device of claim 8,
wherein the authentication information comprises at least one piece of provision condition information, security procedure information, or receiver information.

11. The directional communication device of claim 10,
wherein the provision condition information comprises at least one of:
information on a reference range for a relative location between the directional communication device and the second external device, or
a reference time, and
wherein the instructions, when executed by the at least one processor individually or collectively, is further configured to cause the directional communication device to determine whether the state in which the second external device faces the directional communication device satisfies the first condition, based on the provision condition information.

12. The directional communication device of claim 11, wherein the instructions, when executed by the at least one processor individually or collectively, is further configured to cause the directional communication device to determine that the first condition is satisfied, based on continuing of the state in which the relative location between the directional communication device and the second external device is included in the reference range for the reference time.

13. The directional communication device of claim 10, wherein the instructions, when executed by the at least one processor individually or collectively, is further configured to cause the directional communication device to determine whether the second external device is a target to issue the action information, based on the identification information and the receiver information.

14. The directional communication device of claim 8, wherein the action information comprises information on the control right, and
wherein the instructions, when executed by the at least one processor individually or collectively, is further configured to cause the directional communication device to:
identify a first direction in which the second external device is located through a first communication circuit, and
perform a first function of the directional communication device in the first direction, based on reception of a control signal from the second external device acquiring the control right.

15. The directional communication device of claim 14, wherein the directional communication device is a speaker device, and
wherein the instructions, when executed by the at least one processor individually or collectively, is further configured to cause the directional communication device to control an output of the speaker to face the first direction in which the second external device is located, based on reception of the control signal.

16. A second electronic device comprising:
at least one communication circuit;
at least one processor; and
memory storing instructions,
wherein the instructions, when executed by the at least one processor individually or collectively, is configured cause the second electronic device to:
identify a first external device supporting a directional communication scheme through a first communication circuit supporting the directional communication scheme among the at least one communication circuit,
transmit identification information to the identified first external device through the at least one communication circuit, based on satisfaction of a first condition by a state in which the second electronic device faces the first external device,
receive action information from the identified first external device through the at least one communication circuit, based on authentication of the second electronic device based on the identification information and authentication information stored in the identified first external device, wherein the action information and the authentication information is provided from a second external device to the first external device, and
based on the action information, perform a control operation based on a control right, or output a content file.

17. The second electronic device of claim 16, wherein the instructions, when executed by the at least one processor individually or collectively, is further configured to cause the second electronic device to:
transmit the identification information to the identified first external device through the first communication circuit supporting an ultra-wideband (UWB) communication scheme, based on a satisfaction of the first condition by the state in which the second electronic device faces the first external device, and
receive the action information from the identified first external device through the first communication circuit, based on a satisfaction of a preset condition by the state in which the second electronic device faces the identified first external device.

18. The second electronic device of claim 16, wherein the instructions, when executed by the at least one processor individually or collectively, is further configured to cause the second electronic device to:
make a request for transmitting the content file to a server storing the content file corresponding to the action information through the at least one communication circuit, and
receive the content file from the server through the at least one communication circuit.

19. The second electronic device of claim 16, wherein the instructions, when executed by the at least one processor individually or collectively, is further configured to cause the second electronic device to:
make a request for transmitting the information on the control right to a server storing information on the control right corresponding to the action information through the at least one communication circuit, and
receive the information on the control right from the server through the at least one communication circuit.

20. The second electronic device of claim 19, wherein the instructions, when executed by the at least one processor individually or collectively, is further configured to cause the second electronic device to control the identified first external device or a second external device different from the identified first external device, based on the control right.

21. The second electronic device of claim 20, wherein the instructions, when executed by the at least one processor individually or collectively, is further configured to cause the second electronic device to cause the second external device to display an object indicating that an ultra-wideband (UWB) device is recognized for performing a security procedure requested by the UWB device.

22. The second electronic device of claim 21, wherein a content file is executed through an application of the second external device based on a result of the security procedure.

23. The second electronic device of claim 22, wherein the content file is at least one of a video file, an audio file or a text file.

* * * * *